(12) United States Patent
van Oirschot

(10) Patent No.: US 8,882,180 B2
(45) Date of Patent: Nov. 11, 2014

(54) DOOR HOOKING ARRANGEMENT FOR A MOTOR VEHICLE

(75) Inventor: Dirk van Oirschot, Luettelforst-Schwalmtal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 13/134,228

(22) Filed: Jun. 1, 2011

(65) Prior Publication Data

US 2011/0291442 A1  Dec. 1, 2011

(30) Foreign Application Priority Data

Jun. 1, 2010  (DE) .......................... 10 2010 029 592

(51) Int. Cl.
*B60R 22/24*  (2006.01)
*B60J 5/04*  (2006.01)

(52) U.S. Cl.
CPC .................................... *B60J 5/0458* (2013.01)
USPC ......... 296/187.03; 24/295; 180/289; 411/508

(58) Field of Classification Search
USPC ........ 16/82, 402, 404; 24/293, 294, 295, 453;
49/371, 501, 502, 503; 180/274, 289;
292/DIG. 39, DIG. 40, DIG. 41;
296/146.6, 146.9, 152, 187.03, 187.12,
296/202; 411/508, 516, 520; 248/71
See application file for complete search history.

(56) References Cited

U.S. PATENT DOCUMENTS

| | | | | |
|---|---|---|---|---|
| 1,083,697 | A * | 1/1914 | Neptune ....................... | 403/274 |
| 1,192,733 | A * | 7/1916 | Bennett ......................... | 292/175 |
| 1,902,499 | A * | 3/1933 | Herreshoff ...................... | 49/366 |
| 2,241,657 | A * | 5/1941 | Dehring .......................... | 248/71 |
| 2,309,261 | A * | 1/1943 | Tallman ......................... | 248/71 |
| 2,319,059 | A * | 5/1943 | Hansman ....................... | 411/508 |
| 2,367,657 | A * | 1/1945 | Boersma ........................ | 52/511 |
| 2,682,385 | A * | 6/1954 | Schluter ........................ | 248/262 |
| 2,709,612 | A * | 5/1955 | Fox ................................ | 292/300 |
| 2,974,383 | A * | 3/1961 | Bright ............................ | 24/564 |
| 3,024,509 | A * | 3/1962 | Hamann ......................... | 24/453 |
| RE26,247 | E * | 8/1967 | Tinnerman ..................... | 248/72 |
| 3,468,392 | A * | 9/1969 | Hass ............................. | 180/281 |
| 3,788,686 | A * | 1/1974 | Rossie et al. ................ | 296/146.6 |
| 3,819,228 | A * | 6/1974 | Cornacchia .................. | 296/146.9 |
| 3,887,227 | A | 6/1975 | Deckert | |
| 4,307,911 | A * | 12/1981 | Pavlik ...................... | 296/187.12 |
| 4,438,969 | A * | 3/1984 | Kamijo et al. ............ | 296/146.9 |
| 4,451,078 | A * | 5/1984 | Maeda ....................... | 296/187.12 |

(Continued)

FOREIGN PATENT DOCUMENTS

| | | | |
|---|---|---|---|
| EP | 278995 A1 * | 8/1988 | |
| JP | 01247214 A * | 10/1989 | |
| JP | 06040259 A * | 2/1994 | |
| WO | WO 8501552 A1 * | 4/1985 | |

*Primary Examiner* — Glenn Dayoan
*Assistant Examiner* — Paul Chenevert
(74) *Attorney, Agent, or Firm* — L.C. Begin & Associates, PLLC

(57) ABSTRACT

A door hooking arrangement for a motor vehicle for protecting against an impact on a vehicle door (1) including a catch hook (5) and a receiver (6) for the catch hook (5), the catch hook (5) and receiver (6) being correspondingly arranged on the vehicle door (1) and a door frame (4) in the vehicle. The catch hook (5) includes at least one barb (9). Thus, with plastic deformation of the vehicle door, the catch hook (5) is hooked very firmly in the receiver (6).

4 Claims, 2 Drawing Sheets

(56) References Cited

U.S. PATENT DOCUMENTS

Figure 1A:
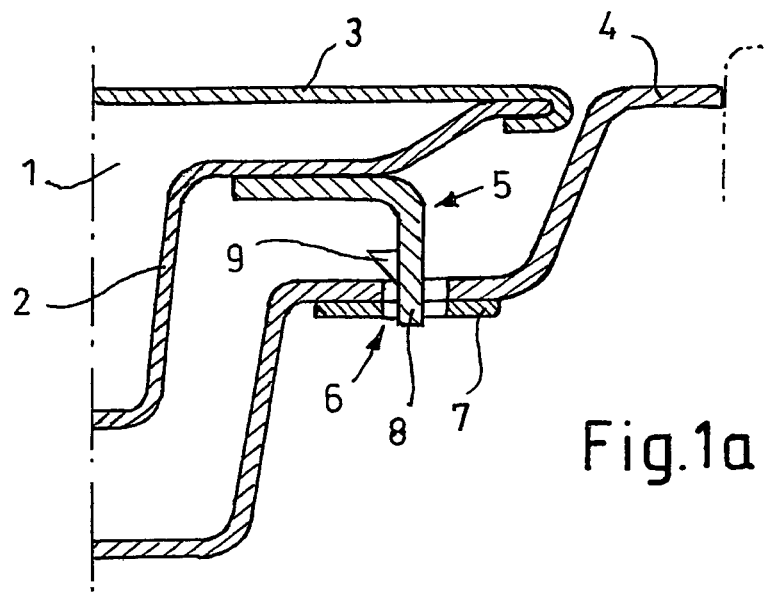

| | | | |
|---|---|---|---|
| 4,462,633 A * | 7/1984 | Maeda | 296/187.12 |
| 4,843,990 A * | 7/1989 | Snyder | 440/61 R |
| 5,029,934 A | 7/1991 | Schrader et al. | |
| 5,197,560 A * | 3/1993 | Oda et al. | 180/69.21 |
| 5,306,067 A * | 4/1994 | Hull et al. | 296/146.6 |
| 5,364,157 A * | 11/1994 | Siedlecki | 296/146.6 |
| 5,452,499 A * | 9/1995 | Schmidt et al. | 24/453 |
| 5,518,290 A | 5/1996 | Reinhard et al. | |
| 5,599,057 A * | 2/1997 | Hirahara et al. | 296/146.6 |
| 5,833,480 A * | 11/1998 | Austin | 439/95 |
| 5,947,547 A * | 9/1999 | Deeks et al. | 296/146.7 |
| 6,457,924 B1 * | 10/2002 | Wallace | 411/112 |
| 6,749,253 B1 * | 6/2004 | Zummallen et al. | 296/187.12 |
| 6,988,762 B2 * | 1/2006 | Carre | 296/187.12 |
| 7,311,169 B1 * | 12/2007 | Caliskan et al. | 180/274 |
| 7,992,925 B2 * | 8/2011 | Lagrut | 296/187.09 |
| 7,998,232 B2 * | 8/2011 | Krueger et al. | 55/385.3 |
| 8,210,602 B2 * | 7/2012 | Kobayashi et al. | 296/203.03 |
| 2008/0169386 A1 * | 7/2008 | Schnyder et al. | 248/71 |

* cited by examiner

DOOR HOOKING ARRANGEMENT FOR A MOTOR VEHICLE

The invention relates to a door hooking arrangement for a motor vehicle for protecting against an impact on a vehicle door.

Door hooking arrangements are disclosed in DE 1806716 and EP 0642940 A1. In this case, a catch hook on the vehicle door engages in a receiver for the catch hook in the door frame of the vehicle. In the event of an impact on the vehicle door, said vehicle door is plastically deformed and moves in the direction of the door frame. In this case, the catch hook is hooked in the receiver and is intended to prevent the vehicle door from being forced into the door frame. Nevertheless, in certain circumstances the catch hook may be pulled out of the receiver, so that the vehicle door at least partially opens up the door opening in the door frame which, however, is intended to be avoided during an impact, if possible.

EP 0423465 A1 shows an improved catch hook. At the front end the catch hook has a bent-back flange, which when the vehicle door is plastically deformed is able to be hooked with an undercut in the receiver, so that it is harder to be able to pull the hooked catch hook out of the receiver. Nevertheless, the spatial requirement for said catch hook is still very high and the pull-out forces depend very much on the bending stiffness of the flange on the catch hook.

It is, therefore, the object of the invention to provide an improved catch hook which has a high resistance against pull-out forces, where there is a small spatial requirement.

As the catch hook comprises at least one barb, when the vehicle door is plastically deformed the catch hook may be hooked very firmly in the receiver. In this case, by "barb" is to be understood a shaped portion and/or arrangement on the catch hook, which with specific plastic deformations of the vehicle door in the direction of the receiver permits a slight movement of the catch hook, but with a movement of the catch hook out of the receiver counters this movement with a very high resistance. By "plastic deformation of the vehicle door", is to be understood all deformations of the vehicle door which are produced in the event of an impact of the vehicle door or a different vehicle on the vehicle and which are not reversible.

Advantageously, in the operating state of the vehicle the catch hook engages at least partially in the receiver. Thus the catch hook is positioned in the receiver so that, in the case of plastic deformation of the vehicle door, it is immediately hooked with the receiver.

In an advantageous embodiment, in the operating state of the vehicle the barb does not engage behind the receiver. Then the barb is located in the normal state outside the receiver, even when the vehicle door is closed. Only by the plastic deformation of the vehicle door does the barb enter the receiver and thus hook the catch hook even more firmly in the receiver. This is also advantageous in the case of a front or rear impact. As the barb is located outside the side structure, with a front and/or rear impact, the barb is not able to be inadvertently hooked and the vehicle door may be opened after the front and/or rear impact. This is advantageous relative to the known catch hooks, which for example comprise a mushroom head, as said catch hooks are able to be hooked in the event of a front and/or rear impact which may lead to problems with opening the door.

Advantageously, the catch hook has at least two barbs, which are arranged opposing one another on the catch hook. Thus in the event of plastic deformation of the vehicle door, the catch hook with the barbs is hooked in any case into the receiver, irrespective of how the plastic deformation is produced.

In a further embodiment, the receiver encloses the catch hook on both sides. Thus it is ensured that the barb(s) is(are) hooked in any case in the receiver.

Advantageously, the receiver has a width which is narrower than the width of the catch hook in the region of the barb. Thus the catch hook is only able to be inserted into the receiver with a certain force, as when the barb passes through the receiver, the barb and/or the receiver have to be elastically and/or plastically deformed. As soon as the barb is located in the receiver, the catch hook is only able to be pulled out of the receiver with a greater amount of pull-out force, as the path out of the receiver for the catch hook is blocked by the elastic resilience of the receiver and/or the barb.

The barb may be arranged as a separate part on the catch hook. Thus the catch hook has one or more barbs, which are connected by suitable means to the catch hook base body, for example welded or riveted.

Preferably, a barb is formed as an integral part of the catch hook. Thus the catch hook in specific regions has shaped portions, which fulfill the function of the barbs.

Preferably, the barb, the catch hook and/or the recess are elastically and/or plastically deformed when the catch hook enters the receiver. By such a deformation, the contact between the catch hook, barb and recess is ensured so that a barb achieves relatively secure resistance against pulling the catch hook out of the recess.

Advantageously, a barb is plastically deformed when pulled out. This may take place, for example, by the barb, which lies flat against the catch hook when entering the recess, being bent up when pulled out, as it has been caught in the recess. Thus the barb has a greater width and it is even harder to be able to pull it out of the receiver.

In a preferred embodiment, the catch hook with at least one barb is stamped in one piece out of a sheet metal part. The barb may be produced, for example, as a rectangular stamped part, which is connected to the sheet metal part at the side in the direction of insertion and is bent back in the rearward direction. Alternatively, the barb may be a sheet metal edge bent back in the rearward direction. This permits the simple production of the catch hook without additional material or joining costs.

Figure 2:
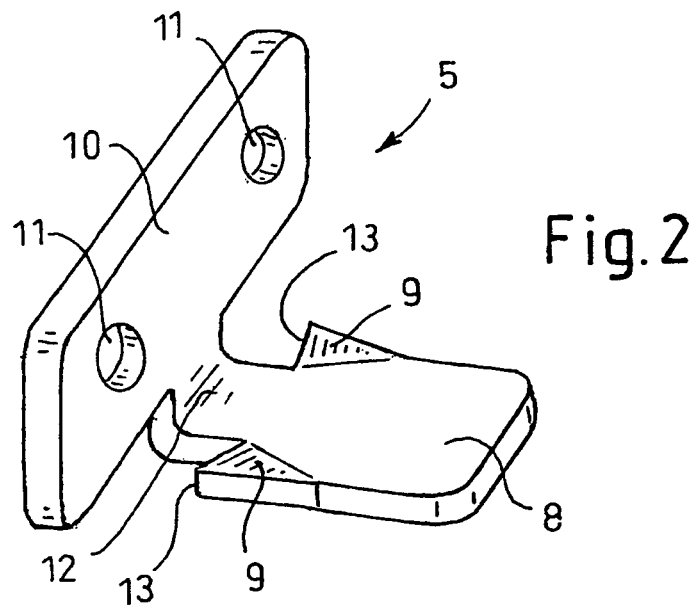
Figure 1B:
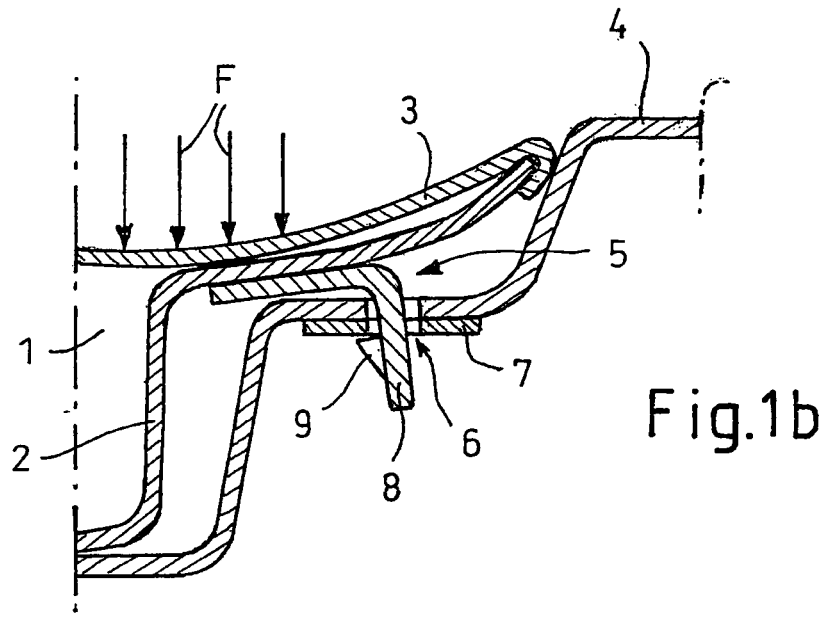
Figure 3A:
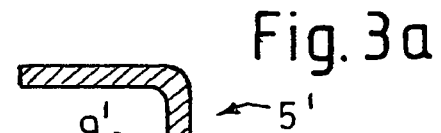
Figure 3B:
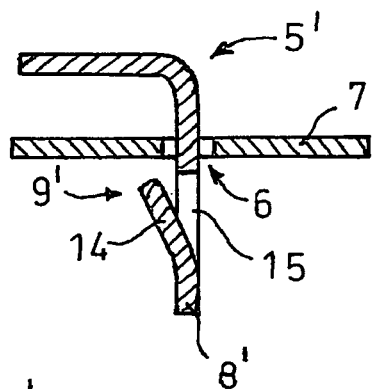
Figure 3C:
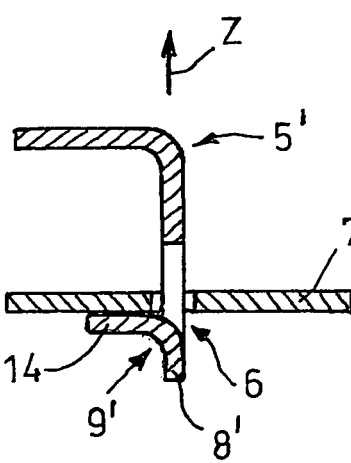

Further advantageous embodiments of the invention are shown in the figures, in which:

FIG. 1a: shows a schematic section through a vehicle door in the region of a door hooking arrangement according to the invention in the operating state;

FIG. 1b: shows a schematic section through a vehicle door of FIG. 1a after plastic deformation due to an impact;

FIG. 2: shows a perspective view of a catch hook with barbs;

FIGS. 3a-c: show schematic sections through a further door hooking arrangement in the operating state (3a); in the event of an impact (3b) and in the event of an impact with pull-out forces (3c).

FIG. 1a shows the section through a vehicle door 1, consisting of an inner metal sheet 2 and an outer metal sheet 3, as well as a door frame 4 in the region of a door hooking arrangement. The door hooking arrangement consists of the catch hook 5, which is fastened to the inner metal sheet 2 of the vehicle door 1, and a recess 6 in the door frame 4. For increased absorption of pull-out force, the door frame 4 is reinforced in the region of the recess 6 with a reinforcement plate 7.

The catch hook 5 has a catch tab 8 on which a barb 9 is formed. In the operating state, i.e. when the vehicle door 1 is closed, the catch tab 8 engages in the recess 6 but without coming into contact with the vehicle frame 4. The barb 9 is located outside the recess 6 in the operating state. Thus it is ensured that in normal operation when opening and closing the vehicle door the barb 9 of the catch hook 5 does not become hooked in the vehicle frame 4, and thus it is not possible for the vehicle door 1 to be opened. Due to the very narrow design of the catch tab 8 and the barb 9, the catch hook 5 itself may be constructed in an extremely space-saving manner and also only requires a very small recess 6 in the door frame 4.

In FIG. 1*b* the vehicle door of FIG. 1*a* is shown after plastic deformation due to an impact, the acting impact forces being indicated by the arrow F. In the event of an impact, the vehicle door 1 is pushed inwards with the inner metal sheet 2 and the outer metal sheet 3 into the door frame 4, and is thus plastically deformed. By this deformation, the catch tab 8 of the catch hook 5 is also forced into the recess 6 of the door frame 4, so that the barb 9 is also located behind the recess 6. If now the plastic deformation of the vehicle door 1 increases further, so that pull-out forces act on the catch hook 5, the barb 9 is hooked into the recess 6 on the reinforcement plate and/or the door frame 4 and thus prevents the catch tab 8 from being easily pulled out of the recess 6.

FIG. 2 shows a perspective view of the catch hook 5 of FIG. 1. The catch hook 5 has a base plate 10 with two screw holes 11, said catch hook being screwed to the inner metal plate 2 (not shown) of the vehicle door 1. Bent back from the base plate 10 is the neck 12 of the catch tab which continues into the catch tab 8 and which has a narrower width than the catch tab 8. At the transition between the neck 12 of the catch tab and the catch tab 8, two barbs 9 are formed by said barbs being bent back at the protruding edges 13 of the catch tab 8.

FIG. 3*a* shows a schematic section through a catch hook 5' in which a barb 9' is formed on the catch tab 8', by a small metal tab 14 being stamped out from the catch tab 8' on three sides, and remaining connected to the catch tab 8' on the side facing the recess 6. The barb 9' is produced by the small sheet metal tab 14 with the three free sides being bent back outwardly from the plane of the metal tab 8'.

In FIG. 3*b* it is shown how during an impact the catch hook 5' moves into the recess 6 so that the barb 9' moves behind the recess 6 and the reinforcement plate 7. With the passage of the barb 9' through the recess 6 the metal tab 14 is slightly deformed, by being forced into the cutout 15 of the catch tab 8'. As soon as the sheet metal tab 14 is located behind the cutout 15, it springs back outwardly in a resilient manner.

In FIG. 3*c* it is shown how the catch hook 5' behaves during the impact, when a pull-out force Z acts thereon. The outwardly sprung sheet metal tab 14 is caught on the reinforcement plate 7 and is bent back further by the acting pull-out force Z. The barb 9' is now deformed to such an extent that pulling out the catch hook 5' from the recess is only possible by destroying the catch hook 5' and/or the reinforcement plate 7 and/or the door frame 4, not shown. Thus very high pull-out forces may be produced, i.e. even with a very strong impact with high pull-out forces the catch hook 5' will securely hold the vehicle doors 1 in the door frame 4.

The invention is not limited to the embodiments shown, but all arrangements of barbs on the catch hook are possible which produce the effect of increased pull-out forces.

What is claimed is:

1. A vehicle door hooking arrangement comprising:
  a catch hook including a base, a neck extending from the base, and a flat catch tab extending from the neck and having a pair of opposed side edges, wherein a portion of the catch tab along each side edge extends in a direction away from a plane defined by the catch tab and terminates in a sharp corner so as to form a flat barb, and
  a receiver including a first side, a second side opposite the first side, and a recess extending between the first and second sides,
  wherein the catch hook is structured such that a width dimension of the catch hook along portions from which the barbs project is greater than a width dimension of the recess both prior to and after passage of the catch tab and barbs from the first side to the second side.

2. The vehicle door hooking arrangement as claimed in claim 1 wherein each portion of the catch tab extending in a direction away from the plane has a triangular configuration.

3. A motor vehicle including a vehicle door hooking arrangement as claimed in claim 1.

4. The door hooking arrangement of claim 1 wherein the barbs are structured to deform responsive to a motion of the catch tab and barbs in a direction from the second side toward the first side, to impede motion in the direction.

* * * * *